(12) United States Patent
Osawa et al.

(10) Patent No.: US 7,478,977 B2
(45) Date of Patent: Jan. 20, 2009

(54) BALL ENDMILL

(75) Inventors: Jiro Osawa, Aichi (JP); Yasuo Hamatake, Aichi (JP); Wataru Aoki, Nagoya (JP)

(73) Assignee: OSG Corporation, Aichi (JP)

( * ) Notice: Subject to any disclaimer, the term of this patent is extended or adjusted under 35 U.S.C. 154(b) by 35 days.

(21) Appl. No.: 10/586,002

(22) PCT Filed: Oct. 18, 2005

(86) PCT No.: PCT/JP2005/019085

§ 371 (c)(1),
(2), (4) Date: Jul. 12, 2006

(87) PCT Pub. No.: WO2007/046131

PCT Pub. Date: Apr. 26, 2007

(65) Prior Publication Data
US 2007/0081868 A1  Apr. 12, 2007

(51) Int. Cl.
B23C 5/10 (2006.01)

(52) U.S. Cl. .......................... 407/42; 407/54

(58) Field of Classification Search .............. 407/34, 407/53, 54, 58–61, 24; 408/227, 230
See application file for complete search history.

(56) References Cited

U.S. PATENT DOCUMENTS

| 271,646 A | * | 2/1883 | Martignoni | 407/54 |
| 4,123,186 A | * | 10/1978 | Hoadley | 407/54 |
| 4,712,948 A | * | 12/1987 | Kidani | 407/42 |
| 2004/0105729 A1 | * | 6/2004 | Giessler et al. | 407/53 |
| 2005/0025584 A1 | * | 2/2005 | Kolker et al. | 407/54 |
| 2007/0172321 A1 | * | 7/2007 | Nagai | 407/53 |

FOREIGN PATENT DOCUMENTS

| JP | 53-31286 | | 3/1978 |
| JP | 55042760 A | * | 3/1980 |
| JP | 2-303707 | | 12/1990 |
| JP | 02-303707 | | 12/1990 |
| JP | 3-65614 | | 6/1991 |
| JP | 4-51928 | | 12/1992 |
| JP | 06218611 A | * | 8/1994 |
| JP | 10249623 A | * | 9/1998 |
| JP | 2000190122 A | * | 7/2000 |
| JP | 2002187011 A | * | 7/2002 |
| JP | 2002-529261 | | 9/2002 |
| WO | WO 2005/077579 | | 8/2005 |

* cited by examiner

*Primary Examiner*—Boyer D Ashley
*Assistant Examiner*—Sara Addisu
(74) *Attorney, Agent, or Firm*—Muramatsu & Associates

(57) ABSTRACT

A ball endmill having a cylindrical tool body and ball-nosed end cutting edges each of which includes a first portion and a second portion continuous to the first portion. The first and second portions are located at a radially inner portion of each ball-nosed end cutting edge in a distal end view. The first portion is convex in a direction of rotation of the tool body and has a first radius of curvature seen in a distal end view. A ratio of the first radius of curvature to an outside diameter of the cylindrical body is between 0.025 and 0.10. The second portion is convex in the direction of the rotation of the tool body and has a second radius of curvature as measured in the distal end view. The second radius of curvature is larger than the first radius of curvature.

8 Claims, 3 Drawing Sheets

Fig. 2
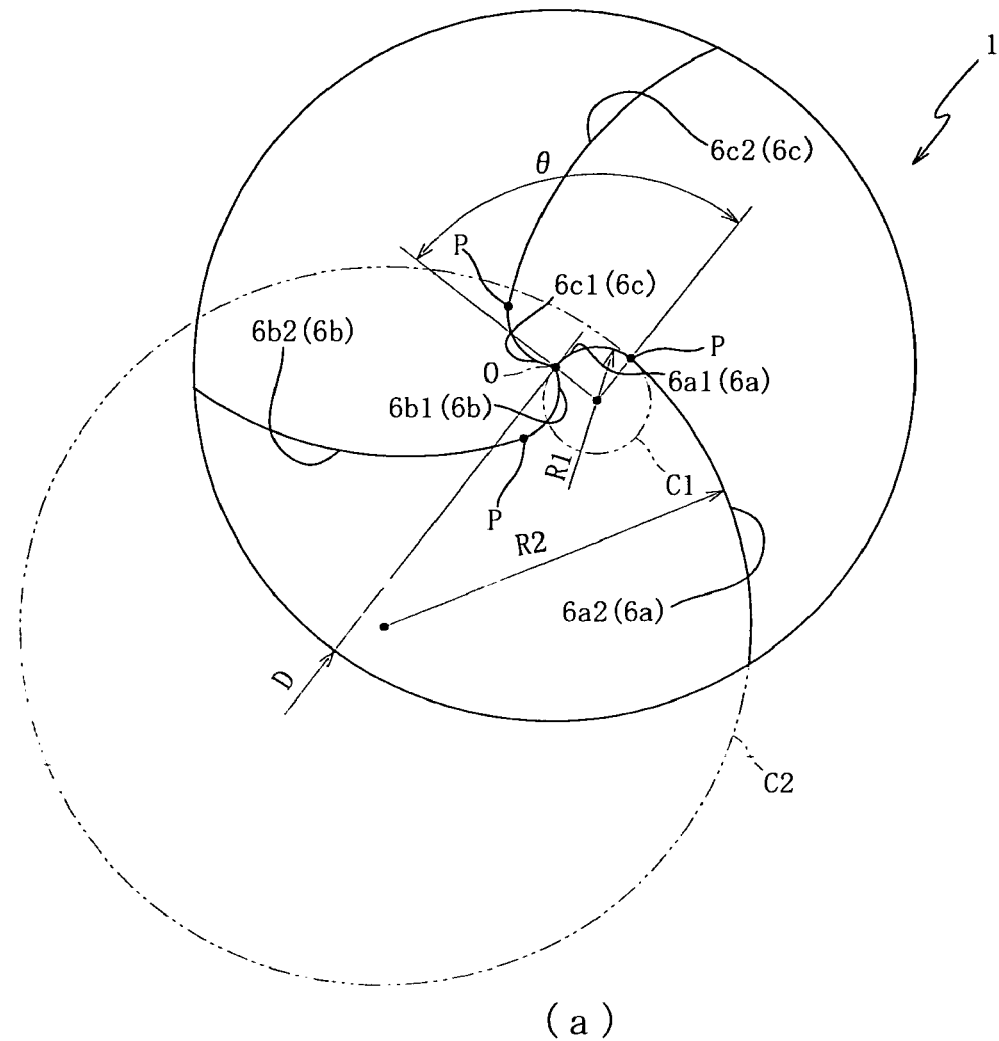
(a)
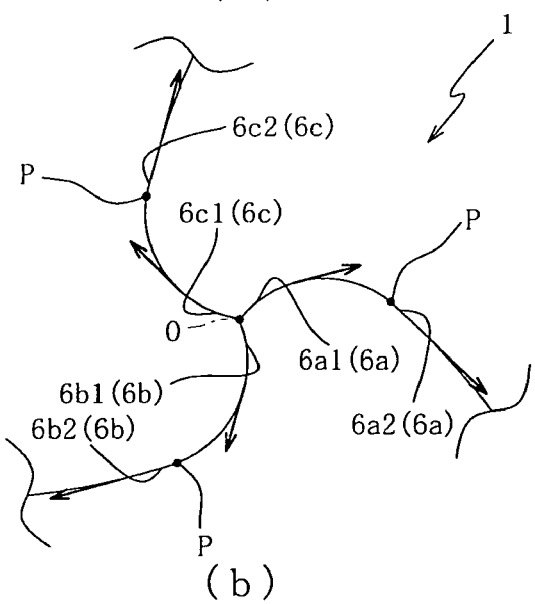
(b)

BALL ENDMILL

TECHNICAL FIELD

The present invention relates to a ball endmill, and more particularly to such a ball endmill that is capable of restraining its vibration thereby permitting a cutting operation to be performed at an increased feed rate with an increased depth of cut and leading to an improvement in efficiency of the cutting operation.

BACKGROUND ART

For machining a die or mold, there is often used a ball endmill having ball-nosed end cutting edges in its axially distal end portion. Conventionally, in such a ball endmill, each of the ball-nosed end cutting edges has an arcuate shape that is convex in a direction of rotation of the ball endmill for the purpose of improving its cutting performance. It is common that a radius of curvature of each arcuate-shaped ball-nosed end cutting edge is adapted to be constant from its inner peripheral portion to its outer peripheral portion (for example, see Patent Document 1). Patent Document 1: JP-H04-51928Y2

DISCLOSURE OF INVENTION

Object to be Solved by the Invention

In recent years, there is a demand for reduction in time required for a cutting operation in which, for example, a die or mold is machined. For reducing the time for the cutting operation, namely, for improving the cutting efficiency, it is necessary to increase the feed rate and depth of cut.

However, in the conventional ball endmill, since the radius of curvature of each ball-nosed end cutting edge is constant from the inner peripheral portion to the outer peripheral portion, a cutting resistance (cutting torque) is exerted by a workpiece and acts on the ball endmill in a direction that is concentrated to be substantially constant, and consequently causing the ball endmill to be vibrated. Due to such a problem, the feed rate and the depth of cut can not be increased whereby the cutting efficiency can not be improved.

The present invention was developed for solving the above-described problem, and has an object to provide a ball endmill that is capable of restraining its vibration thereby permitting a cutting operation to be performed at an increased feed rate with an increased depth of cut and leading to an improvement in efficiency of the cutting operation.

Measures for Achieving the Object

For achieving the object, a first aspect of the invention defines a ball endmill including a cylindrical tool body which is to be rotated about an axis thereof as a rotary axis, and ball-nosed end cutting edges which are provided in a distal end portion of the tool body and which describe a semispherical-shaped locus while the tool body is being rotated, wherein each of the ball-nosed end cutting edges has a first portion formed to extend from the axis as a starting end thereof, and a second portion formed to extend from a terminal end of the first portion as a starting end thereof, wherein the first portion has an arcuate shape which is convex forward in a direction of rotation of the tool body and which has a first radius of curvature in a distal end view seen in a direction of the axis, the first radius of curvature being in a range of from 0.025 D to 0.10 D relative to an outside diameter D, and wherein the second portion has an arcuate shape which is convex forward in the direction of rotation of the tool body and which has a second radius of curvature as seen in the distal end view in the direction of the axis, the second radius of curvature being larger than the first radius of curvature.

According to a second aspect of the invention, in the ball endmill defined in the first aspect of the invention, the first portion has a central angle that is in a range of from 60° to 120° as seen in the distal end view in the direction of the axis.

Effects of the Invention

In the ball endmill defined in the first aspect of the invention, each of the ball-nosed end cutting edges includes the first and second portions having the respective first and second radii of curvature which are different in value from each other. This construction causes a cutting resistance (cutting torque) exerted by a workpiece, to act in a direction that is different in the first and second portions of each ball-nosed end cutting edge, thereby making it possible to restrain vibration of the ball endmill.

That is, the direction in which the cutting resistance (cutting torque) is exerted by the workpiece on the ball endmill corresponds to a direction along each ball-nosed end cutting edge, i.e., a direction tangential to a circular arc defining each ball-nosed end cutting edge. Therefore, where the radius of curvature of each ball-nosed end cutting edge is constant from the inner peripheral portion up to the outer peripheral portion of the ball-nosed end cutting edge, as in the conventional ball endmill, the direction of the cutting resistance (cutting torque) does not substantially differ in the inner and outer peripheral portions of the ball-nosed end cutting edge, thereby easily causing the ball endmill to be vibrated.

On the other hand, in the ball endmill of the present invention, it is possible to cause the direction of the cutting resistance (cutting torque) exerted by the workpiece, to differ in the first and second portions of each ball-nosed end cutting edge, thereby making it possible to restrain vibration of the ball endmill. Owing to the reduction in the vibration, the feed rate and the depth of cut can be increased whereby the cutting efficiency can be improved.

Further, in the ball endmill of the present invention, the first radius of curvature is in the range of from 0.025 D to 0.10 D relative to the outside diameter D. If the first radius of curvature is smaller than 0.025 D relative to the outside diameter D, a spacing gap between the first portions of the adjacent ball-nosed end cutting edges in vicinity of the axis of the ball endmill is reduced whereby performance of evacuation of cutting chips is deteriorated. On the other hand, in the ball endmill of the present invention in which the first radius of curvature is not smaller than 0.025 D relative to the outside diameter D of the ball endmill, the spacing gap between the first portions can be sufficient for improving the performance of evacuation of cutting chips.

Further, in the case where the first radius of curvature is smaller than 0.025 D relative to the outside diameter D, the spacing gap between the first portions of the adjacent ball-nosed end cutting edges in vicinity of the axis of the ball endmill is reduced too much. The excessive reduction of the spacing gap, when each ball-nosed end cutting edge is ground by a grinding wheel in a grinding step, could cause the grinding wheel to interfere with the adjacent ball-nosed end cutting edge. On the other hand, in the ball endmill of the present invention in which the first radius of curvature is not smaller than 0.025 D relative to the outside diameter D, the spacing gap between the first portions can be sufficient for preventing the interference of the grinding wheel with the adjacent ball-nosed end cutting edge. Thus, it is possible to eliminate necessity of an excessively highly accurate control in the grinding step, leading to reduction in cost for machining the ball endmill.

Where the above-described interference of the grinding wheel could be caused, there is a limitation in designing configuration of a portion that could suffer from the interference (for example, an elimination of such a portion could result in reduction of strength). In this sense, the sufficient spacing gap between the first portions, which prevents the interference of the grinding wheel, is effective to increase a degree of freedom in designing.

If the first radius of curvature is larger than 0.10 D relative to the outside diameter D, the direction of a line tangential to the first portion of each ball-nosed end cutting edge does not substantially vary, as in the conventional ball endmill, the direction in which the cutting resistance (cutting torque) exerted by the workpiece and acting on the ball endmill does not substantially vary, thereby easily causing the vibration of the ball endmill. On the other hand, in the ball endmill of the present invention in which the first radius of curvature is not larger than 0.10 D relative to the outside diameter D, the direction of the line tangential to the first portion is caused to vary, so that the direction of the cutting resistance (cutting torque) can be caused to vary, thereby making it possible to restrain vibration of the ball endmill.

Further, in the case where the first radius of curvature is larger than 0.10 D relative to the outside diameter D, with an axial depth of cut of the ball endmill being set to a limit value 0.1 D (i.e., 10% of the outside diameter D), only the first portion of each ball-nosed end cutting edge is brought into contact with the workpiece. In this case, it is not possible to effectively enjoy the feature that causes the direction of the cutting resistance (cutting torque) exerted by the workpiece and acting on the ball endmill, to be different in the first and second portions of each ball-nosed end cutting edge. On the other hand, in the ball endmill of the present invention in which the first radius of curvature is not larger than 0.10 D relative to the outside diameter D, even where the axial depth of cut of the ball endmill is set to the limit value 0.1 D, the second portion as well as the first portion can be brought into contact with the workpiece, thereby making it possible to effectively enjoy the feature that causes the direction of the cutting resistance (cutting torque) exerted by the workpiece and acting on the ball endmill, to be different in the first and second portions. Thus, the vibration of the ball endmill can be restrained.

Further, in the ball endmill of the present invention, since each ball-nosed end cutting edge includes the first and second portions with the first radius of curvature being in the range of from 0.025 D to 0.10 D relative to the outside diameter D, each of the first and second radii of curvature can be made smaller than in the conventional ball endmill, whereby each ball-nosed end cutting edge can have an increased length. This construction leads to increase in a length of time for which each ball-nosed end cutting edge is in contact with the workpiece and the consequent reduction in an impact load acting on the ball endmill, thereby making it possible to restrain vibration of the ball endmill.

In addition, in the ball endmill of the present invention, since each ball-nosed end cutting edge can have the increased length, as described above, each ball-nosed end cutting edge is brought in contact at its increased area with the workpiece, thereby making is possible to increase a cutting performance of the ball endmill. Consequently, the feed rate and the depth of cut can be increased, enabling the cutting efficiency to be improved.

Specifically described, for example, in an operation to cut a metal wire (having a diameter d) by a metal column that is provided by a rectangular parallelepiped body (having a height a, a width b and a depth c), the metal wire can be cut in a shorter length of time in case where the metal column is operated to slide on the metal wire to utilize a length (depth c) of an edge that is an intersection between two surfaces of the metal column (i.e., two surfaces defining the height a and width b), than in a case where the metal column is pressed at its edge against the metal wire. That is, by thus increasing the cutting performance, the cutting efficiency can be increased.

Further, in the ball endmill of the present invention, the second portion as well as the first portion has an arcuate shape which is convex in the direction of rotation of the ball endmill, and is contiguous to the terminal end of the first portion, so that the cutting chips can be evacuated along each ball-nosed end cutting edge. That is, this construction improves the performance of evacuation of the cutting chips.

In the ball endmill defined in a second aspect of the invention, in addition to the features provided by the ball endmill defined in the first aspect of the invention, there is a feature that the central angle of the first portion is in the range of from 60° to 120°. If the central angle is smaller than 60°, the length of the first portion of each ball-nosed end cutting edge as measured from its starting end (the axis of the ball endmill) to its terminal end (portion contiguous to the second portion) is made small, it is not possible to effectively utilize the effect that the direction of the cutting resistance (cutting torque) exerted by the workpiece and acting on the first portion is caused to vary. On the other hand, in the ball endmill of the present invention in which the central angle is not smaller than 60°, the length of the first portion of each ball-nosed end cutting edge can be made large sufficiently for utilizing the effect of the first portion which varies the direction of the cutting resistance (cutting torque).

If the central angle is larger than 120°, with an axial depth of cut of the ball endmill being set to a limit value 0.1 D (i.e., 10% of the outside diameter D), only the first portion of each ball-nosed end cutting edge is brought into contact with the workpiece. In this case, it is not possible to effectively enjoy the feature that causes the direction of the cutting resistance (cutting torque) exerted by the workpiece and acting on the ball endmill, to be different in the first and second portions of each ball-nosed end cutting edge. On the other hand, in the ball endmill of the present invention in which the central angle is not larger than 120°, even where the axial depth of cut of the ball endmill is set to the limit value 0.1 D, the second portion as well as the first portion can be brought into contact with the workpiece, thereby making it possible to cause the direction of the cutting resistance (cutting torque) exerted by the workpiece and acting on the ball endmill, to be different in the first and second portions. Thus, the vibration of the ball endmill can be restrained.

BRIEF DESCRIPTION OF DRAWINGS

FIG. 2 A set of schematic views schematically showing a distal end portion of the ball endmill.

| | |
|---|---|
| 1 | ball endmill |
| 2 | tool body |
| 6a-6c | ball-nosed end cutting edges |
| 6a1-6c1 | first portions |
| 6a2-6c2 | second portions |
| D | outside diameter |
| O | axis |
| P | connection point (terminal end of first portion, starting end of second portion) |
| R1 | first radius of curvature |
| R2 | second radius of curvature |
| θ | central angle |

BEST MODE FOR CARRYING OUT THE INVENTION

Hereinafter, a preferred embodiment of the present invention will be described with reference to the drawings. View (a) of FIG. 1 is a front elevational view of a ball endmill 1 according to the embodiment of the invention, and view (b) of FIG. 1 is an enlarged side view of the ball endmill 1 as seen in a direction indicated by arrow 1 (b) in view (a) of FIG. 1.

The ball endmill 1 is of solid type, and is a tool that is to be used principally for the purpose of performing an operation to machine a free-form surface of a die or mold. In the machining operation, a rotational force of a machine tool such as a machining center is transmitted to the ball endmill 1 via a holder (not shown) that is provided to hold a portion (a right side portion as seen in view (a) of FIG. 1) of a tool body 2 of the ball endmill 1.

The tool body 2 is constituted by cemented carbide alloy that is obtained by pressure sintering of tungsten carbide (WC) or the like. The portion (right side portion as seen in view (a) of FIG. 1) provides a shank portion 2a that is formed to have a cylindrical shape. The ball endmill 1 is attached to the machine tool, with the shank portion 2a being held by the holder.

Figure 1:
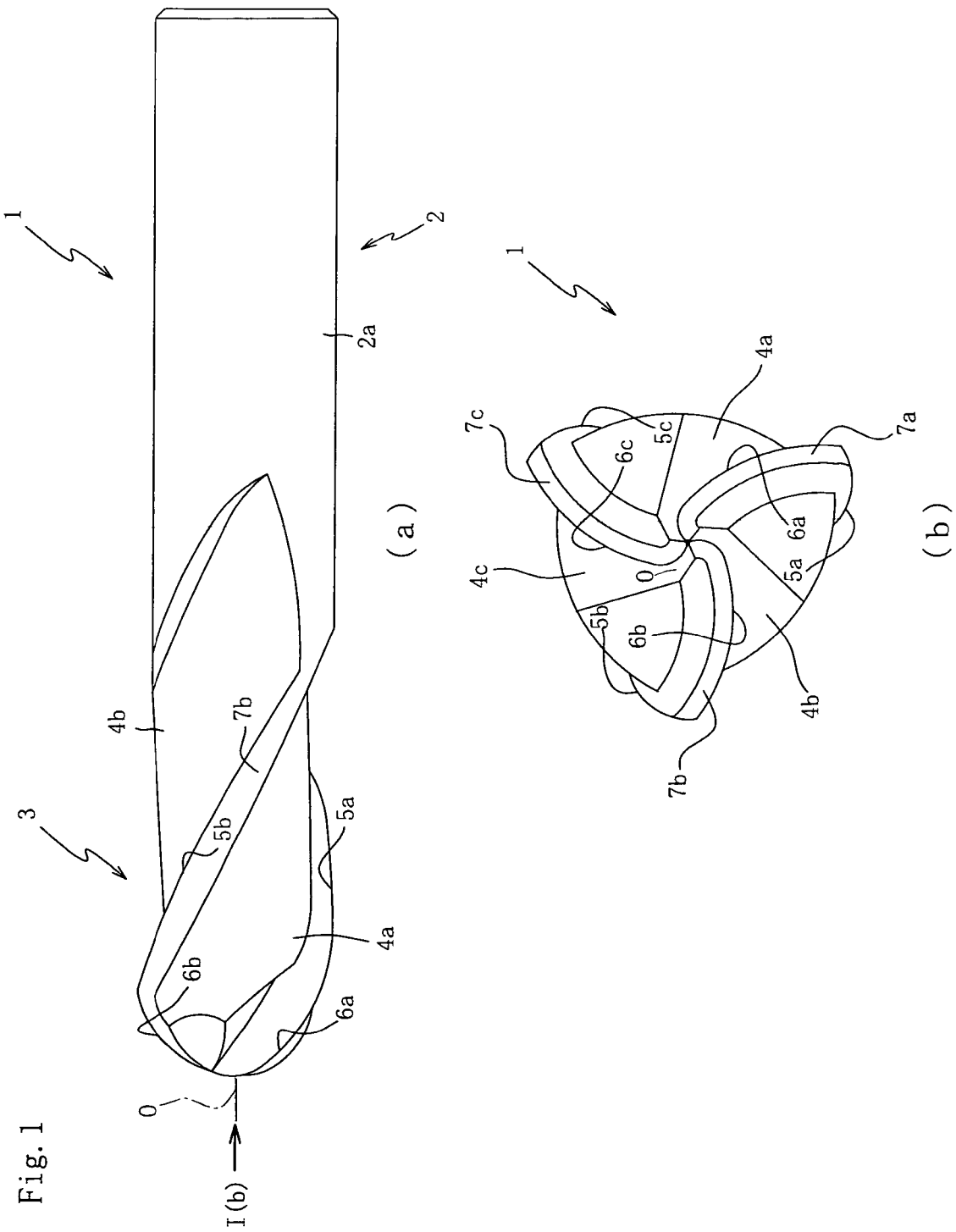
FIG. 1 A set of views showing a ball endmill according to an embodiment of the present invention, wherein view (a) is a front elevational view of the ball endmill, and view (b) is an enlarged side view showing in enlargement the ball endmill as seen in a direction indicated by arrow 1 (b) in view (a).

Meanwhile, in another portion (left side portion as seen in view (a) of FIG. 1) of the tool body 2, there is provided a blade portion 3 having chip evacuation flutes 4a-4c, peripheral cutting edges 5a-5c, ball-nosed end cutting edges 6a-6c and lands 7a-7c. The free-form surface of the die or mold is machined by the blade portion 3.

The chip evacuation flutes 4a-4c are provided by three helical flutes to store and evacuate cutting chips produced during the machining operation, and are disposed symmetrically with respect to an axis O of the ball endmill 1.

The peripheral cutting edges 5a-5c are cutting edges formed on an outer periphery of the tool body 2. Each of the three peripheral cutting edges 5a-5c is provided with an edge at which a corresponding one of the chip evacuation flutes 4a-4c intersects with a corresponding one of the lands 7a-7c each formed in the outer periphery of the tool body 2 and having a predetermined width.

The ball-nosed end cutting edges 6a-6c are formed in a distal end portion (left side portion as seen in view (a) of FIG. 1) of the blade portion 3, and describe a semi-spherical-shaped locus while the ball endmill 1 is being rotated. Like each of the three peripheral cutting edges 5a-5c, each of the three ball-nosed end cutting edges 6a-6c is provided with an edge at which a corresponding one of the chip evacuation flutes 4a-4c intersects with a corresponding one of the lands 7a-7c. The ball-nosed end cutting edges 6a-6c are contiguous to the respective peripheral cutting edges 5a-5c.

In a distal end view seen in a direction (indicated by arrow 1 (b) in view (a) of FIG. 1, of the axis O of the ball endmill 1, as shown in view (b) of FIG. 1, each of the ball-nosed end cutting edges 6a-6c extends from the outer periphery to the axis O, and has an arcuate shape which is convex in a direction of rotation of the ball endmill 1 (in the counterclockwise direction as seen in view (b) of FIG. 1). The ball-nosed end cutting edges 6a-6c will be described in detail with reference to FIG. 2.

FIG. 2 is a set of schematic views schematically showing the distal end portion of the ball endmill 1, wherein view (a) of FIG. 2 is the schematic view obtained by projecting the ball-nosed end cutting edges 6a-6c onto a plane, and view (b) of FIG. 2 is the enlarged schematic view of a part of view (a) of FIG. 2. It is noted that an outer peripheral portion of each ball-nosed end cutting edge 6 is not illustrated in view (b) of FIG. 2.

As shown in view (a) of FIG. 2, each of the ball-nosed end cutting edges 6a-6c is constituted by a first portion 6a1-6c1 whose starting end corresponds to the axis O of the ball endmill 1, and a second portion 6a2-6c2 whose starting end is located at a connection point P is connected to a terminal end of the first portion 6a1-6c1.

The first portion 6a1-6c1 constitutes a radially inner portion of each ball-nosed end cutting edge 6a-6c, and has an arcuate shape which is convex in the rotation direction of the ball endmill 1 (in the counterclockwise direction as seen in view (a) of FIG. 2) and which has a first radius R1 of curvature.

It is preferable that the first radius R1 of curvature is in a range of from 0.025 D to 0.10 D relative to an outside diameter D (i.e., a diameter as measured in a portion of the blade portion 3 in which the ball-nosed end cutting edges 6a-6c are connected to the respective peripheral cutting edges 5a-5c, irrespective of whether each peripheral cutting edge 5a-5c is provided by a straight cutting edge or a tapered cutting edge). If the first radius R1 of curvature is smaller than 0.025 D relative to the outside diameter D, a spacing gap between the first portions 6a1-6c1 of the adjacent ball-nosed end cutting edges 6a-6c in vicinity of the axis O of the ball endmill 1 is reduced whereby performance of evacuation of cutting chips is reduced. On the other hand, in the ball endmill 1 of the present embodiment in which the first radius R1 of curvature is not smaller than 0.025 D relative to the outside diameter D, the spacing gap between the first portions 6a1-6c1 can be sufficient for improving the performance of evacuation of cutting chips.

Further, in the case where the first radius R1 of curvature is smaller than 0.025 D relative to the outside diameter D, the spacing gap between the first portions 6a1-6c1 of the adjacent ball-nosed end cutting edges 6a-6c in vicinity of the axis O of the ball endmill 1 becomes too small. Because the spacing gap is too small, when each ball-nosed end cutting edge 6a-6c is ground by a grinding wheel in a grinding step, could cause the grinding wheel to interfere with the adjacent ball-nosed end cutting edge 6a-6c. On the other hand, in the ball endmill 1 of the present embodiment in which the first radius R1 of curvature is not smaller than 0.025 D relative to the outside diameter D, the spacing gap between the first portions 6a1-6c1 can be sufficient for preventing the interference of the grinding wheel with the adjacent ball-nosed end cutting edge 6a-6c. Thus, it is possible to eliminate necessity of an excessively highly accurate control in the grinding step, leading to reduction in cost for machining the ball endmill 1.

Where the above-described interference of the grinding wheel could be caused, there is a limitation in designing configuration of a portion that could suffer from the interference (for example, an elimination of such a portion could result in reduction of strength). In this sense, the sufficient spacing gap between the first portions 6a1-6c1, which prevents the interference of the grinding wheel, is effective to increase a degree of freedom in designing.

If the first radius R1 of curvature is larger than 0.10 D relative to the outside diameter D, the direction of a line tangential to the first portion 6a1-6c1 of each ball-nosed end cutting edge 6a-6c does not substantially vary, as in the conventional ball endmill, the direction in which the cutting resistance (cutting torque) is exerted by the workpiece and acting on the ball endmill 1 does not substantially vary, thereby easily causing the vibration of the ball endmill 1. On the other hand, in the ball endmill 1 of the present embodiment in which the first radius R1 of curvature is not larger than 0.10 D relative to the outside diameter D, the direction of the line tangential to the first portion 6a1-6c1 is caused to vary, so that the direction of the cutting resistance (cutting torque) can be caused to vary, thereby making it possible to restrain vibration of the ball endmill 1.

Further, in the case where the first radius R1 of curvature is larger than 0.10 D relative to the outside diameter D, with an axial depth of cut of the ball endmill 1 being set to a limit value 0.1 D (i.e., 10% of the outside diameter D), only the first portion 6a1-6c1 of each ball-nosed end cutting edge 6a-6c is brought into contact with the workpiece. In this case, it is not possible to effectively enjoy the feature that causes the direction of the cutting resistance (cutting torque) exerted by the workpiece and acting on the ball endmill 1, to be different in the first and second portions 6a1-6c1, 6a2-6c2 of each ball-nosed end cutting edge 6a-6c, as indicated by arrows in view (b) of FIG. 2. On the other hand, in the ball endmill 1 of the present embodiment in which the first radius R1 of curvature is not larger than 0.10 D relative to the outside diameter D, where the axial depth of cut of the ball endmill 1 is set to the limit value 0.1 D, the second portion 6a2-6c2 as well as the first portion 6a1-6c1 can be brought into contact with the workpiece, thereby making it possible to cause the direction of the cutting resistance (cutting torque) exerted by the workpiece and acting on the ball endmill 1, to be different in the first and second portions 6a1-6c1, 6a2-6c2. Thus, the vibration of the ball endmill 1 can be restrained.

It is preferable that the outside diameter D is not smaller than 1 mm. If the outside diameter D is smaller than 1 mm, the spacing gap between the first portions 6a1-6c1 of the adjacent ball-nosed end cutting edges 6a-6cc in vicinity of the axis O of the ball endmill 1 is excessively reduced. The reduction of the spacing gap, when each ball-nosed end cutting edge 6a-6cc is ground by the grinding wheel in the grinding step, could cause the grinding wheel to interfere with the adjacent ball-nosed end cutting edge 6a-6cc. On the other hand, with the outside diameter D being not smaller than 1 mm, the spacing gap between the first portions 6a1-6c1 can be sufficient for preventing the interference of the grinding wheel with the adjacent ball-nosed end cutting edge 6a-6cc. In the present embodiment, the outside diameter D is 12 mm, the first radius R1 of curvature is 0.0625 D (0.75 mm) relative to the outside diameter D (D =12 mm), and the first radii R1 of curvature of the first portions 6a1-6c1 of the respective ball-nosed end cutting edges 6a-6cc are provided by respective radii of curvature that are equal to each other.

Further, each of the first portions 6a1-6c1 of the respective ball-nosed end cutting edges 6a-6cc is defined by a central angle θ. Here, as shown in FIG. 2 (a), the central angle θ is an angle between a first line connecting a center of the first radius R1 and the axis O and a second line connecting the center of the first radius R1 and the connection point P.

It is preferable that the central angle θ is in a range of from 60° to 120°. If the central angle is smaller than 60°, the length of the first portion 6a1-6c1 of each ball-nosed end cutting edge 6a-6cc as measured from its starting end (the axis O of the ball endmill 1) to its terminal end (connection point P) becomes too small, it is not possible to effectively utilize the effect of the invention that the direction of the cutting resistance (cutting torque) exerted by the workpiece and acting on the first portion 6a1-6c1 is caused to vary. On the other hand, in the ball endmill 1 of the present embodiment in which the central angle θ is not smaller than 60°, the length of the first portion 6a1-6c1 of each ball-nosed end cutting edge 6a-6c becomes sufficiently large for utilizing the effect of the first portion 6a1-6c1 which varies the direction of the cutting resistance (cutting torque).

If the central angle θ is larger than 120°, with an axial depth of cut of the ball endmill 1 being set to the limit value 0.1 D (i.e., 10% of the outside diameter D), only the first portion 6a1-6c1 of each ball-nosed end cutting edge 6a-6c is brought into contact with the workpiece. In this case, it is not possible to effectively enjoy the feature that causes the direction of the cutting resistance (cutting torque) exerted by the workpiece and acting on the ball endmill 1, to be different in the first and second portions 6a1-6c1, 6a2-6c2 of each ball-nosed end cutting edge 6a-6c, as indicated by arrows in view (b) of FIG. 2.

On the other hand, in the ball endmill 1 of the present embodiment in which the central angle θ is not larger than 120°, where the axial depth of cut of the ball endmill 1 is set to the limit value 0.1 D, the second portion 6a2-6c2 as well as the first portion 6a1-6c1 can be brought into contact with the workpiece, thereby making it possible to cause the direction of the cutting resistance (cutting torque) exerted by the workpiece and acting on the ball endmill 1, to be different in the first and second portions 6a1-6c1, 6a2-6c2. Thus, the vibration of the ball endmill 1 can be restrained. In the present embodiment, the central angle θ is 90°, namely, the central angles θ defining the first portions 6a1-6c1 of the respective ball-nosed end cutting edges 6a-6c are all the same to each other.

The second portion 6a2-6c2 constitutes a radially outer portion of each ball-nosed end cutting edge 6a-6c, and has an arcuate shape which is convex in the rotation direction of the ball endmill 1 (in the counterclockwise direction as seen in view (a) of FIG. 2) and which has a second radius R2 of curvature. A first circle C1 that is partially constituted by the circular arc defining the first portion 6a1-6c1 is inscribed at the connection point P to a second circle C2 that is partially constituted by the circular arc defining the second portion 6a2-6c2.

It is preferable that the second radius R2 of curvature is in a range of from 0.55 D to 0.65 D relative to the outside diameter D. If the second radius R2 of curvature is smaller than 0.55 D relative to the outside diameter D, the second portion 6a2-6c2 of each ball-nosed end cutting edges 6a-6c can not be smoothly contiguous to the corresponding peripheral cutting edge 5a-5c, thereby reducing performance of evacuation of the cutting chips. On the other hand, in the ball endmill 1 of the present embodiment in which the second radius R2 of curvature is not smaller than 0.55 D relative to the outside diameter D, the performance of evacuation of the cutting chips can be improved.

Further, in the case where the second radius R2 of curvature is larger than 0.65 D relative to the outside diameter D, the direction of a line tangential to the second portion 6a2-6c2 of each ball-nosed end cutting edge 6a-6c does not substantially vary, as in the conventional ball endmill, the direction in which the cutting resistance (cutting torque) is exerted by the workpiece and acts on the ball endmill 1 does not substantially vary, thereby easily causing the vibration of the ball endmill 1.

On the other hand, in the ball endmill 1 of the present embodiment in which the second radius R2 of curvature is not larger than 0.65 D relative to the outside diameter D, the direction of the line tangential to the second portion 6a2-6c2 is caused to vary, so that the direction of the cutting resistance (cutting torque) can be caused to vary, thereby making it possible to restrain vibration of the ball endmill 1. In the present embodiment, the second radius R2 of curvature is 0.60 D (R2=7.2 mm) relative to the outside diameter D (D=12 mm), and the second radii R2 of curvature of the second portions 6a2-6c2 of the respective ball-nosed end cutting edges 6a-6c are provided by respective radii of curvature that are equal to each other.

Figure 3:
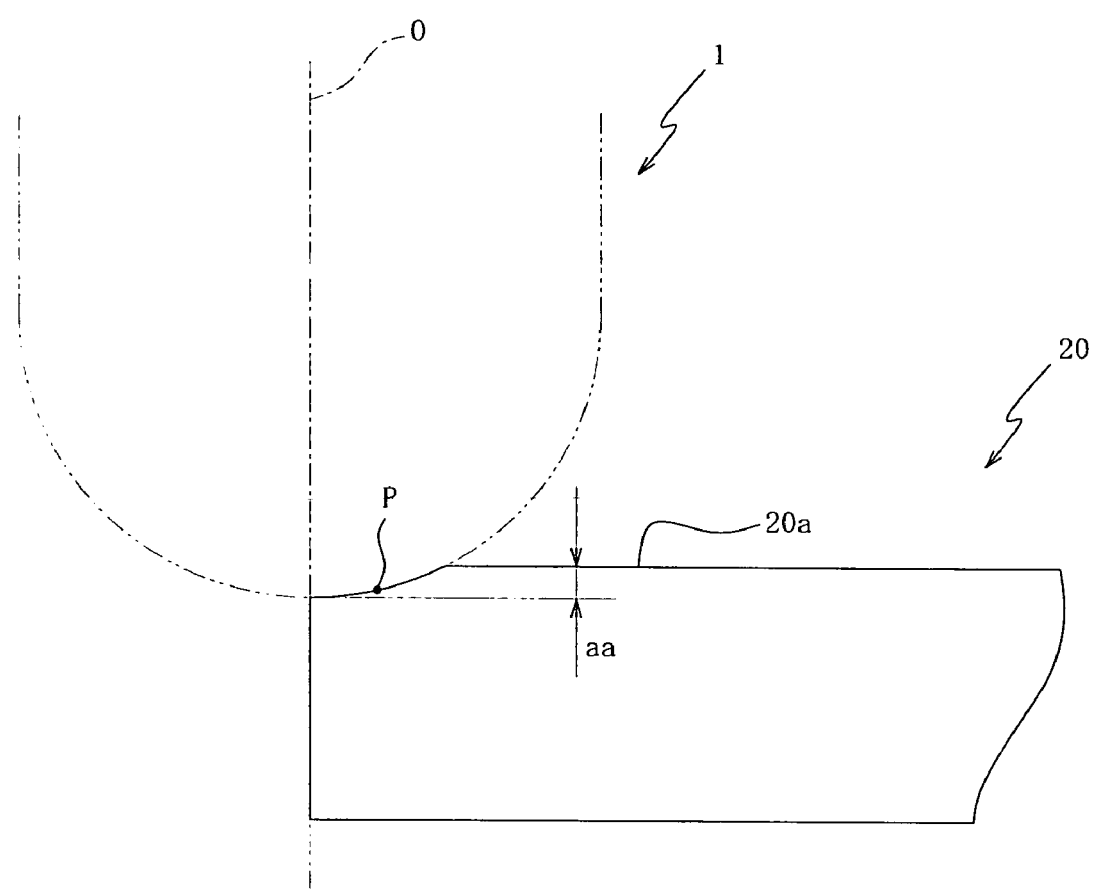
FIG. 3 A side view of a workpiece used in a cutting test.

Next, there will be described a cutting test that was conducted by using the ball endmill 1 constructed as described. FIG. 3 is a side view of a workpiece 20 used in the cutting test. It is noted that a portion (right side portion as seen in FIG. 3) of the workpiece 20 is not illustrated in FIG. 3.

In the cutting test, the ball endmill 1 was arranged to be opposed to a cut surface 20a of the workpiece 20 with the axis O being held perpendicular to the surface 20a, and a cutting operation is performed by rotating the ball endmill 1 about the axis O while moving the ball endmill 1 in a direction perpendicular to the axis O under a predetermined cutting condition (such as an axial depth aa of cut as measured in the direction of the axis O). During the cutting operation, vibration (cutting resistance) generated on the ball endmill 1 was measured.

Specification of the cutting condition in the cutting test is as follows:
Material of the workpiece 20: JIS-S50C
Cutting oil: No use (dry cutting with application of air blow)
Used machine: Horizontal type machining center
Spindle rotation speed: 4000 rev/min
Table feed rate: 1000 mm/min
Axial depth aa of cut: 0.5 mm The cutting test was conducted by using, in addition to the ball endmill 1 (hereinafter referred to as "invention product") described in the above description of the embedment, a ball endmill (hereinafter referred to as "conventional product") in which the radius of curvature of each arcuate-shaped ball-nosed end cutting edge is constant from the inner peripheral portion to the outer peripheral portion. The invention product and the conventional product are made of the same tool material (cemented carbide alloy). The number of the arcuate-shaped ball-nosed end cutting edges of the invention and conventional products is three. The conventional product is constructed such that the radius of curvature of each ball-nosed end cutting edge is 21.6 mm (that is three times as large as the second radius R2 of curvature of the second portion 6a2-6c2 of the invention product) in the distal end view seen in the direction of the axis of the ball endmill and such that the radii of curvature of the respective three ball-nosed end cutting edges are provided by respective radii of curvature that are equal to each other.

According to the result of the cutting test, in the conventional product, the direction of the cutting resistance (cutting torque) exerted by a workpiece and acting on the ball endmill was concentrated to be substantially constant, whereby the ball endmill was easily vibrated, Specifically described, in a case of cutting of the workpiece by the ball endmill for a length of time of 10 seconds, an average value of the cutting torque was 180 Nm and a variation amount of the cutting torque was 150 Nm (a maximum value of the variation amount was 230 Nm)

On the other hand, in the invention product, the cutting test revealed that the vibration of the ball endmill 1 can be restrained more than in the conventional product, since the direction of the cutting resistance (cutting torque) exerted by the workpiece and acting on the ball endmill 1 can be caused to vary. Specifically described, in a case of cutting of the workpiece by the ball endmill 1 for a length of time of 10 seconds, an average value of the cutting torque was 140 Nm and a variation amount of the cutting torque was 70 Nm (a maximum value of the variation amount was 100 Nm).

As described above, in the ball endmill 1, each of the ball-nosed end cutting edges 6a-6c includes the first and second portions 6a1-6c1, 6a2-6c2 having the respective first and second radii R1, R2 of curvature which are different in value from each other. This construction causes the cutting resistance (cutting torque) exerted by the workpiece 20 to act in the direction that differs in the first and second portions 6a1-6c1, 6a2-6c2 of each ball-nosed end cutting edge 6a-6c (see view (b) of FIG. 2), thereby making it possible to restrain vibration of the ball endmill 1.

That is, the direction in which the cutting resistance (cutting torque) is exerted by the workpiece 20 on the ball endmill 1 corresponds to a direction along each ball-nosed end cutting edge 6a-6c, i.e., a direction tangential to a circular arc defining each ball-nosed end cutting edge 6a-6c. Therefore, where the radius of curvature of each ball-nosed end cutting edge 6a-6c is constant from the inner peripheral portion up to the outer peripheral portion of the ball-nosed end cutting edge 6a-6c, as in the conventional ball endmill, the direction of the cutting resistance (cutting torque) does not substantially differ in the inner and outer peripheral portions of the ball-nosed end cutting edge 6a-6c, thereby easily causing the ball endmill 1 to be vibrated.

On the other hand, in the ball endmill 1 of the present embodiment, as described above, it is possible to cause the direction of the cutting resistance (cutting torque) exerted by the workpiece 20, to be different in the first and second portions 6a1-6c1, 6a2-6c2 of each ball-nosed end cutting edge 6a-6c, thereby making it possible to restrain vibration of the ball endmill 1. Owing to the reduction in the vibration, the feed rate and the depth of cut can be increased whereby the cutting efficiency can be improved.

Further, in the ball endmill 1 of the present embodiment, since each ball-nosed end cutting edge 6a-6c includes the first and second portions 6a1-6c1, 6a2-6c2 with the first radius R1 of curvature being in the range of from 0.025 D to 0.10 D relative to the outside diameter D, each of the first and second radii R1, R2 of curvature can be made smaller than in the conventional ball endmill, whereby each ball-nosed end cutting edge 6a-6c can have an increased length. This construction leads to increase in a length of time for which each ball-nosed end cutting edge 6a-6c is in contact with the cut surface 20a and the consequent reduction in an impact load acting on the ball endmill 1, thereby making it possible to restrain vibration of the ball endmill 1.

In addition, in the ball endmill 1 of the present embodiment, since each ball-nosed end cutting edge 6a-6c can have the increased length, as described above, each ball-nosed end cutting edge 6a-6c is brought in contact at its increased area with the cut surface 20a, thereby making is possible to increase a cutting performance of the ball endmill 1. Consequently, the feed rate and the depth of cut can be increased, enabling the cutting efficiency to be improved.

Further, in the ball endmill 1 of the present embodiment, the second portion 6a2-6c2 as well as the first portion 6a1-6c1 has the arcuate shape which is convex in the direction of rotation of the ball endmill 1, and is contiguous to the terminal end (connection point P) of the first portion 6a1-6c1, so that the cutting chips can be evacuated along each ball-nosed end cutting edge 6a-6c. That is, this construction improves the performance of evacuation of the cutting chips.

While the present invention has been described based on the embodiment, it is to be easily imagined that the present invention is not at all limited to the details of the above-described embodiment but may be subjected to various improvements and modifications within a range that is not deviated from the gist of the invention.

For example, in the above-described embodiment, the ball endmill 1 is a three-flute endmill having three teeth each provided with the peripheral and ball-nosed end cutting edges 5a-5c, 6a-6c. However, the ball endmill 1 is not necessarily limited to such a specific structure, but may be constructed to have two teeth or four or more teeth, for example. In this case, too, as in the above-described embodiment, the direction of the cutting resistance (cutting torque) exerted by the workpiece 20 and acting on the ball endmill 1 can be varied, thereby making it possible to restrain vibration of the ball endmill 1.

Further, in the above-described embodiment, the first radii R1 of curvature of the first portions 6a1-6c1 of the respective ball-nosed end cutting edges 6a-6c are provided by respective radii of curvature that are equal to each other, and the second radii R2 of curvature of the second portions 6a2-6c2 of the respective ball-nosed end cutting edges 6a-6c are provided by respective radii of curvature that are equal to each other. However, the first radii R1 of curvature of the first portions 6a1-6c1 may be provided by respective radii of curvature that are different from each other, and the second radii R2 of curvature of the second portions 6a2-6c2 may be provided by respective radii of curvature that are different from each other.

The invention claimed is:

1. A ball endmill comprising:
    a cylindrical tool body which is to be rotated about an axis thereof, and
    ball-nosed end cutting edges which are located in an axially distal end portion of said tool body and which describe a semi-spherical-shaped locus during rotation of said tool body,
    wherein each of said ball-nosed end cutting edges includes a first portion extending from said axis and provided by a radially inner portion of each of said ball-nosed end cutting edges, and a second portion contiguous to said first portion and provided by a radially outer portion of each of said ball-nosed end cutting edges, both the first portion and the second portion being located at a radially inner portion of the ball-nosed end cutting edge as seen in a distal end view,
    wherein said first portion is defined by a circular arc which is convex in a direction of the rotation of said tool body and which has a first radius of curvature in the distal end view, a ratio of said first radius of curvature to an outside diameter of said cylindrical body is in a range between 0.025 and 0.10,
    and wherein said second portion is defined by a circular arc which is convex in said direction of the rotation of said tool body and which has a second radius of curvature in the distal end view, said second radius of curvature is larger than said first radius of curvature.

2. The ball endmill according to claim 1, wherein said circular arc defining said first portion of each of said ball-nosed end cutting edges has a central angle that is not smaller than 60° and is not larger than 120° as measured in said distal end view, where the central angle is an angle between a first line connecting a center of the first radius and the axis and a second line connecting the center of the first radius and a connection point of said first portion and said second portion.

3. The ball endmill according to claim 1,
    wherein said first and second portions of each of said ball-nosed end cutting edges are connected to each other at a connection point,
    and wherein a first circle that is partially constituted by said circular arc defining said first portion is inscribed at said connection point to a second circle that is partially constituted by said circular arc defining said second portion.

4. The ball endmill according to claim 1, further comprising peripheral cutting edges each of which is contiguous to said second portion of a corresponding one of said ball-nosed end cutting edges and extends away from said axially distal end portion toward a shank portion of said tool body.

5. The ball endmill according to claim 1, wherein a ratio of said second radius of curvature to said outside diameter of said cylindrical body is in a range between 0.55 and 0.65.

6. The ball endmill according to claim 1, wherein said ball-nosed end cutting edges consist of at least three ball-nosed end cutting edges.

7. A ball endmill comprising:
    a cylindrical tool body which is to be rotated about an axis thereof, and
    ball-nosed end cutting edges which are located in an axially distal end portion of said tool body and which describe a semi-spherical-shaped locus during rotation of said tool body,
    wherein each of said ball-nosed end cutting edges includes a first portion extending from said axis and provided by a radially inner portion of each of said ball-nosed end cutting edges, and a second portion contiguous to said first portion and provided by a radially outer portion of each of said ball-nosed end cutting edges, both the first portion and the second portion being located at a radially inner portion of the ball-nosed end cutting edge as seen in a distal end view,
    wherein said first portion is defined by a circular arc which is convex in a direction of the rotation of said tool body and which has a first radius of curvature in the distal end view,
    and wherein said second portion is defined by a circular arc which is convex in said direction of the rotation of said tool body and which has a second radius of curvature in the distal end view, said second radius of curvature is different from said first radius of curvature.

8. The ball endmill according to claim 7, wherein said second radius of curvature is larger than said first radius of curvature.

* * * * *